US012703933B2

(12) United States Patent
Dandapure et al.

(10) Patent No.: US 12,703,933 B2
(45) **Date of Patent: *Aug. 11, 2026**

(54) FABRIC WITH MOISTURE MANAGEMENT FUNCTION

(71) Applicant: LULULEMON ATHLETICA CANADA INC., Vancouver (CA)

(72) Inventors: Yogendra V. Dandapure, Vancouver (CA); Sealgi Song, Vancouver (CA)

(73) Assignee: LULULEMON ATHLETICA CANDA INC., Vancouver (CA)

( * ) Notice: Subject to any disclaimer, the term of this patent is extended or adjusted under 35 U.S.C. 154(b) by 490 days.

This patent is subject to a terminal disclaimer.

(21) Appl. No.: 18/248,323

(22) PCT Filed: Dec. 22, 2021

(86) PCT No.: PCT/CA2021/051872
§ 371 (c)(1),
(2) Date: Apr. 7, 2023

(87) PCT Pub. No.: WO2022/133606
PCT Pub. Date: Jun. 30, 2022

(65) Prior Publication Data

US 2023/0373188 A1 Nov. 23, 2023

Related U.S. Application Data

(60) Provisional application No. 63/129,705, filed on Dec. 23, 2020.

(51) Int. Cl.
*D03D 15/527* (2021.01)
*B32B 5/02* (2006.01)
(Continued)

(52) U.S. Cl.
CPC .......... *D03D 15/527* (2021.01); *B32B 5/024* (2013.01); *B32B 5/026* (2013.01); *B32B 5/073* (2021.05);
(Continued)

(58) Field of Classification Search
CPC .......... A41D 31/125; B32B 2262/0223; B32B 2262/0246; B32B 2262/0253;
(Continued)

(56) References Cited

U.S. PATENT DOCUMENTS

| | | |
|---|---|---|
| 4,211,806 A | 7/1980 | Civardi et al. |
| 4,377,615 A | 3/1983 | Suzuki et al. |

(Continued)

FOREIGN PATENT DOCUMENTS

| | | |
|---|---|---|
| CN | 106192177 | 12/2016 |
| CN | 109457362 A | 3/2019 |

(Continued)

OTHER PUBLICATIONS

International Search Report and Written Opinion mailed Apr. 11, 2022 for Application No. PCT/CA2021/051872.

(Continued)

*Primary Examiner* — Lynda Salvatore
(74) *Attorney, Agent, or Firm* — Plumsea Law Group, LLC

(57) ABSTRACT

It is described a knitted/woven fabric with moisture management function comprising a first fabric layer having a first yarn and a second yarn knitted together to form a first layer being semi-hydrophilic or hydrophobic (comprising of lower moisture regain fibers), a second fabric layer comprising a third yarn and a fourth yarn knitted together to form the second fabric layer, the second fabric layer being fully hydrophilic (comprising of higher moisture regain fibers), wherein the first fabric layer has a moisture regain lower
(Continued)

than the moisture regain of the second fabric layer providing a hydrophilic gradient between the first fabric layer and the second fabric layer of the knitted fabric pushing moisture through the first fabric layer in contact with the wearer's skin and out through the second fabric layer.

29 Claims, 3 Drawing Sheets

(51) Int. Cl.

| | |
|---|---|
| ***B32B 5/06*** | (2006.01) |
| ***B32B 5/08*** | (2006.01) |
| ***B32B 5/26*** | (2006.01) |
| ***B32B 7/02*** | (2019.01) |
| ***D03D 1/00*** | (2006.01) |
| ***D03D 11/00*** | (2006.01) |
| ***D03D 13/00*** | (2006.01) |
| ***D03D 15/217*** | (2021.01) |
| ***D03D 15/225*** | (2021.01) |
| ***D03D 15/283*** | (2021.01) |
| ***D03D 15/292*** | (2021.01) |
| ***D03D 15/47*** | (2021.01) |
| ***D03D 15/54*** | (2021.01) |
| ***D04B 1/14*** | (2006.01) |
| ***D04B 1/16*** | (2006.01) |
| ***D04B 1/24*** | (2006.01) |
| ***D04B 21/16*** | (2006.01) |
| ***D04B 21/20*** | (2006.01) |

(52) U.S. Cl.

CPC .................. *B32B 5/08* (2013.01); *B32B 5/26* (2013.01); *B32B 5/263* (2021.05); *B32B 7/02* (2013.01); *D03D 1/00* (2013.01); *D03D 11/00* (2013.01); *D03D 13/004* (2013.01); *D03D 15/217* (2021.01); *D03D 15/225* (2021.01); *D03D 15/283* (2021.01); *D03D 15/292* (2021.01); *D03D 15/47* (2021.01); *D03D 15/54* (2021.01); *D04B 1/14* (2013.01); *D04B 1/16* (2013.01); *D04B 1/24* (2013.01); *D04B 21/16* (2013.01); *D04B 21/207* (2013.01); *B32B 2262/0261* (2013.01); *B32B 2262/0292* (2013.01); *B32B 2262/04* (2013.01); *B32B 2262/062* (2013.01); *B32B 2262/148* (2021.05); *B32B 2262/152* (2021.05); *B32B 2307/728* (2013.01); *B32B 2437/00* (2013.01); *D10B 2201/02* (2013.01); *D10B 2201/20* (2013.01); *D10B 2331/02* (2013.01); *D10B 2331/10* (2013.01); *D10B 2401/022* (2013.01); *D10B 2403/0114* (2013.01); *D10B 2501/00* (2013.01)

(58) Field of Classification Search

CPC .... B32B 2262/0261; B32B 2262/0276; B32B 2262/0292; B32B 2262/04; B32B 2262/062; B32B 2262/08; B32B 2262/148; B32B 2262/152; B32B 2307/728; B32B 2437/00; B32B 5/024; B32B 5/026; B32B 5/073; B32B 5/08; B32B 5/26; B32B 5/263; B32B 5/2795; B32B 7/02; D02G 3/36; D02G 1/00; D02G 11/00; D02G 11/02; D02G 13/004; D02G 15/208; D02G 15/217; D02G 15/225; D02G 15/283; D02G 15/292; D02G 15/47; D02G 15/527; D02G 15/54; D04B 1/14; D04B 1/16; D04B 1/18; D04B 1/24; D04B 21/14; D04B 21/16; D04B 21/18; D04B 21/207; D06P 1/228; D10B 2201/02; D10B 2201/20; D10B 2331/02; D10B 2331/10; D10B 2401/021; D10B 2401/022; D10B 2403/0111; D10B 2403/0114; D10B 2501/00

See application file for complete search history.

(56) References Cited

U.S. PATENT DOCUMENTS

| | | | |
|---|---|---|---|
| 4,465,730 | A | 8/1984 | Okada |
| 4,501,025 | A | 2/1985 | Kuznetz |
| 4,613,544 | A | 9/1986 | Burleigh |
| 4,775,575 | A | 10/1988 | Tang |
| 4,868,928 | A | 9/1989 | Norvell |
| 5,126,182 | A | 6/1992 | Lumb et al. |
| 5,344,698 | A | 9/1994 | Rock et al. |
| 5,364,678 | A | 11/1994 | Lumb et al. |
| 5,378,529 | A | 1/1995 | Bourdeau |
| 5,441,436 | A | 8/1995 | Moretz et al. |
| 5,508,098 | A | 4/1996 | Omar et al. |
| 5,735,145 | A | 4/1998 | Pernick |
| 5,787,503 | A | 8/1998 | Murphy, III |
| 5,902,757 | A | 5/1999 | Stern et al. |
| 6,151,928 | A | 11/2000 | Anyon et al. |
| 6,548,429 | B2 | 4/2003 | Lintecum et al. |
| 6,656,586 | B2 | 12/2003 | Hartzog et al. |
| 6,692,687 | B2 | 2/2004 | Chang et al. |
| 6,782,923 | B2 | 8/2004 | Covelli |
| 6,806,214 | B2 | 10/2004 | Li et al. |
| 6,841,245 | B2 | 1/2005 | Chang et al. |
| 6,855,420 | B2 | 2/2005 | Johnson et al. |
| 6,868,662 | B2 | 3/2005 | Rodgers |
| 6,877,197 | B1 | 4/2005 | Van Trump et al. |
| 6,974,628 | B2 | 12/2005 | Van Trump et al. |
| 6,984,276 | B2 | 1/2006 | Zafiroglu et al. |
| 7,011,885 | B2 | 3/2006 | Chang et al. |
| 7,036,299 | B2 | 5/2006 | Hietpas et al. |
| 7,143,790 | B2 | 12/2006 | Liao |
| 7,195,819 | B2 | 3/2007 | Hietpas et al. |
| 7,299,828 | B2 | 11/2007 | Liao |
| 7,310,932 | B2 | 12/2007 | Liao |
| 7,310,933 | B2 | 12/2007 | Hietpas et al. |
| 7,360,378 | B2 | 4/2008 | Foshee |
| 7,461,499 | B2 | 12/2008 | Liao |
| 7,485,588 | B2 | 2/2009 | Wang et al. |
| 7,517,819 | B2 | 4/2009 | Klutz et al. |
| 7,560,399 | B2 | 7/2009 | Rock et al. |
| 7,637,091 | B2 | 12/2009 | Liao |
| 7,682,994 | B2 | 3/2010 | Van Emden et al. |
| 7,762,287 | B2 | 7/2010 | Liao |
| 8,088,698 | B2 | 1/2012 | Moretti |
| 8,093,160 | B2 | 1/2012 | Tharpe, Jr. et al. |
| 8,127,575 | B2 | 3/2012 | Burrow et al. |
| 8,252,706 | B2 | 8/2012 | Zafiroglu et al. |
| 8,486,847 | B2 | 7/2013 | Fan et al. |
| 8,513,146 | B2 | 8/2013 | Hietpas et al. |
| 8,685,521 | B2 | 4/2014 | Yanagawase et al. |
| 8,702,469 | B2 | 4/2014 | Hurd et al. |
| 8,806,663 | B2 | 8/2014 | White et al. |
| 9,006,117 | B2 | 4/2015 | Johnson et al. |
| 9,107,459 | B2 | 8/2015 | Mayer et al. |
| 9,435,059 | B2 | 9/2016 | Smith et al. |
| 9,487,889 | B2 | 11/2016 | Smith et al. |
| 9,499,929 | B2 | 11/2016 | Farmer |
| 9,689,091 | B2 | 6/2017 | Liao et al. |
| 9,689,092 | B2 | 6/2017 | Liao et al. |
| 9,725,835 | B2 | 8/2017 | Vaglio Tessitore |
| 9,828,705 | B1 | 11/2017 | Shiue |
| 9,869,040 | B2 | 1/2018 | Smith et al. |
| 9,982,372 | B2 | 5/2018 | Liao et al. |
| 10,086,582 | B2 | 10/2018 | Blackford et al. |
| 10,104,917 | B2 | 10/2018 | Liao et al. |
| 10,151,054 | B2 | 12/2018 | Mueller et al. |
| 10,259,191 | B2 | 4/2019 | Wijesena et al. |
| 10,378,127 | B2 | 8/2019 | Aydelette et al. |
| 10,562,267 | B2 | 2/2020 | Seok |

(56) References Cited

U.S. PATENT DOCUMENTS 10,640,915 B2 5/2020 Xing et al.
10,791,776 B2 10/2020 Arnold et al.
10,883,198 B2 1/2021 Waldbauer et al.
10,907,279 B2 2/2021 Smith
11,008,699 B2 5/2021 Loyan et al.
11,098,419 B2 8/2021 Gabbay
11,274,381 B2 3/2022 Liu et al.
11,499,250 B2 11/2022 Smith et al.
2003/0054155 A1 3/2003 Nomi et al.
2003/0181118 A1 † 9/2003 Ko
2004/0048540 A1 3/2004 Dailly
2005/0016614 A1 1/2005 Cohen
2005/0101209 A1 5/2005 Li et al.
2005/0124256 A1 6/2005 Mason et al.
2005/0245159 A1 11/2005 Chmielewski et al.
2007/0141940 A1 6/2007 Baychar
2008/0060113 A1 3/2008 Walsh
2008/0066211 A1 3/2008 Laugt et al.
2008/0132133 A1 6/2008 Yasui et al.
2011/0119811 A1 5/2011 Rock et al.
2011/0197331 A1 8/2011 Reynolds
2011/0217894 A1 9/2011 Coslett et al.
2012/0034834 A1 2/2012 Smith et al.
2012/0047624 A1 3/2012 HubSmith
2012/0064313 A1 3/2012 Rock et al.
2013/0209743 A1 8/2013 Deguchi et al.
2013/0312905 A1 11/2013 Skankey et al.
2014/0298562 A1 10/2014 Luscher
2014/0352073 A1 12/2014 Goenka
2015/0354101 A1 12/2015 Liao et al.
2016/0213078 A1 † 7/2016 Bibeau
2016/0362819 A1 12/2016 Liao et al.
2018/0002839 A1 1/2018 Liao et al.
2018/0339487 A1 11/2018 Gallagher
2019/0133225 A1 5/2019 Brown et al.
2019/0309452 A1 10/2019 Liao et al.
2020/0061953 A1 2/2020 Xing et al.
2020/0216948 A1 7/2020 Conolly et al.
2020/0308728 A1 10/2020 Bivigou-Koumba et al.
2020/0383410 A1 12/2020 Pezzimenti
2021/0015190 A1 1/2021 Lambertz
2021/0120894 A1 4/2021 Bailey et al.
2021/0161219 A1 6/2021 Hutsenpiller
2021/0277554 A1 9/2021 Lawrence
2021/0292937 A1 9/2021 Turner et al.
2022/0061437 A1 3/2022 Riha-Scott
2022/0154372 A1 5/2022 Platz et al.
2022/0339904 A1 10/2022 Amin et al.
2022/0403568 A1 12/2022 Cera et al.
2023/0243074 A1 * 8/2023 Dandapure .............. D02G 3/36

FOREIGN PATENT DOCUMENTS

CN 111267426 A † 6/2020
CN 210679956 U 6/2020
DE 4132427 A1 4/1993
DE 4307501 A1 10/1993
EP 2540886 A2 * 1/2013 .............. D04B 1/16
EP 3109353 A1 * 12/2016 .............. D02G 3/04
EP 3491180 A1 6/2019
EP 3703941 A1 9/2020
EP 3854580 A1 7/2021
EP 3996908 A1 5/2022
EP 4010521 A1 6/2022
GB 1425088 A 2/1976
JP H05269899 A 10/1993
JP 07148876 A 6/1995
JP H09031823 A 2/1997
JP 2003013344 A 1/2003
JP 2005146485 A 6/2005
JP 2009209459 A 9/2009
KR 101861829 B1 5/2018
WO 2004000049 A1 12/2003
WO 2020227596 A1 11/2020
WO 2021183609 A1 9/2021
WO 2022204222 A1 9/2022
WO 2022213199 A1 10/2022
WO 2022214781 A1 10/2022

OTHER PUBLICATIONS

Extended European Search Report issued Mar. 11, 2024 in European Patent Application No. 21908207.0.
Office Action mailed May 5, 2025 for U.S. Appl. No. 18/297,413.

* cited by examiner
† cited by third party

FABRIC WITH MOISTURE MANAGEMENT FUNCTION

CROSS-REFERENCE TO RELATED APPLICATIONS

The present application claims benefit of U.S. Provisional Application No. 63/129,705 filed Dec. 23, 2020, the content of which is hereby incorporated by reference in its entirety.

TECHNICAL FIELD

It is provided a knitted and a woven fabric with moisture management function comprising a hydrophilic gradient.

BACKGROUND

Fabrics used in apparel designed for athletic activities are conceived with the objective of maximizing the body performance by notably controlling the body temperature and keeping the moisture away from the individual in order to reduce the quantity of perspiration that accumulates adjacent to the skin, which causes discomfort with wet cling and increases friction with skin causing chafing The challenge is to manufacture such apparel which generally exhibit characteristics that enhance the performance without compromising the appearance and/or comfort of an individual.

The nature of the textiles that are incorporated into an apparel are generally selected based upon the targeted property for which the apparel is conceived, such as for example wind resistance, reduction of perspiration that accumulates adjacent to the skin, and enhancing comfort of individuals engaged in specific athletic activities.

Textiles normally incorporated in such fabrics may be cotton, wool, silk, synthetic materials such as rayon, nylon, polyester, and polyacrylic for example.

There is always a challenge to provide athletes when competing or training, with improved apparel which will allow to cope with heat/cold from the external environment, but also with heat generated within the body of the athlete as a result of physical exertion and associated sweat and lack of heat dissipation.

It is thus highly desired to be provided with improved fabrics.

SUMMARY

It is provided a knitted or woven fabric with moisture management function comprising a first fabric layer comprising a first yarn to form the first layer being semi-hydrophilic with lower moisture regain and a second fabric layer comprising a second yarn, the second fabric layer being hydrophilic with higher moisture regain, wherein the first fabric layer has a moisture regain lower than the moisture regain of the second fabric layer providing a hydrophilic gradient between the first fabric layer and the second fabric layer of the knitted/or woven fabric pulling moisture through the first fabric layer and pushing it out through the second fabric layer.

The proposed combination of yarns and total moisture regain of the fabric provides optimum comfort to the wearer by making sure that excess sweat does not accumulate next to skin while still provide moisture in the fabric that would help in cooling and breathability.

In an embodiment, the fabric is a weft or warp knitted fabric or a woven fabric.

In an embodiment, the moisture regain of the first fabric layer is in the range of 0.2%-6% and the moisture regain of the second fabric layer is in the range of 4%-16%, and the moisture regain gradient is greater than 3%.

In a further embodiment, the first yarn is selected from a group consisting of a nylon, a polyester, a polypropylene, an acrylic, cotton, wool, silk, regenerated cellulosic fibers and any blend combination thereof.

In an embodiment, the first fabric layer further comprises a third yarn joined together with the first yarn and the second fabric layer further comprises a forth yarn joined together with the second yarn.

In a supplemental embodiment, the third yarn is a synthetic polymer.

In another embodiment, the first fabric layer is a composite blend of a synthetic polymer plaited with an elastane.

In an embodiment, the second yarn comprises a natural or a regenerated cellulosic fiber or a blend of natural or regenerated cellulosic fibers with synthetic fibers such as nylon, a polyester, a polypropylene, an acrylic.

In another embodiment, the second yarn is selected from the group consisting of a cotton, silk, wool, modal, micro-modal, rayon, lyocell, viscose, cupro, artificial silk, nylon, a polyester, a polypropylene, an acrylic and any combination thereof.

In a further embodiment, the fourth yarn is a synthetic polymer.

In an embodiment, the fourth yarn is an elastane.

In another embodiment, the second fabric layer is a composite blend of a natural fiber plaited with an elastane or a blend of natural fiber and synthetic fiber such as nylon, a polyester, a polypropylene, or an acrylic.

In an embodiment, the second yarn is a synthetic polymer.

In another embodiment, the second yarn is selected from a group consisting of a nylon, a polyester, a polypropylene, an acrylic or blended with cotton, silk, wool, modal, micro-modal, rayon, lyocell, viscose, cupro, artificial silk and a combination thereof.

In a further embodiment, the second fabric layer is pitched to increase its surface area.

In a supplemental embodiment, the fabric is knitted and further comprises a connecting yarn binding together the first and the second fabric layers.

In an embodiment, the connecting yarn is at least a single strand.

In an embodiment, the connecting yarn is an elastane.

In a further embodiment, the connecting yarn is a synthetic polymer.

In another embodiment, the connecting yarn is a natural fiber.

In an embodiment, the connecting yarn is a zig-zag structure between the first fabric layer and the second fabric layer. It is understood that the zig-zag structure means mainly a lapping back and forth between first and second layer fabrics in order to connect them.

In a supplemental embodiment, the fabric is knitted from a single jersey plaited construction, a double jersey plaited construction, a tricot or warp knit construction.

In an embodiment, at least one of the first yarn, the second yarn, the third yarn and the fourth yarn is produced by compact spinning.

In an embodiment, the first fabric layer and the second fabric layer are woven with a number of yarn cross overs desired.

In a further embodiment, the yarn cross over is of 3 up and 3 down, 3 up and one down, 3 up and 2 down, or 4 up and 1 down.

It is further provided an article of apparel comprising the fabric as defined herein.

BRIEF DESCRIPTION OF THE DRAWINGS

Reference will now be made to the accompanying drawings.

DETAILED DESCRIPTION

In accordance with the present disclosure, it is provided a knitted or woven fabric with moisture management function comprising a first fabric layer comprising a first yarn and forming a next to skin back fabric layer, the first fabric layer having a first moisture regain and being a semi-hydrophilic or hydrophobic layer and a second fabric layer comprising a second yarn forming a face fabric layer facing towards outside, the second fabric layer having a second moisture regain and being a hydrophilic layer. In case of a knitted fabric, it can further comprise a connecting yarn binding together the first fabric layer and the second fabric layer.

As described herein, the moisture from a wearer's skin is pushed through the first fabric layer and pulled out through the second fabric layer due to the presence of a moisture regain gradient between the first fabric layer and the second fabric layer of the knitted fabric.

In an embodiment, the moisture regain of the first fabric layer is in the range of 0.2%-6% while the moisture regain of the second fabric layer is in a range of 4%-16% and the moisture regain gradient between the two fabric layers is greater than 3%. For example, the moisture regain gradient between the two fabric layers is greater than 3%, such as e.g. between 3%-15%.

Figure 1:
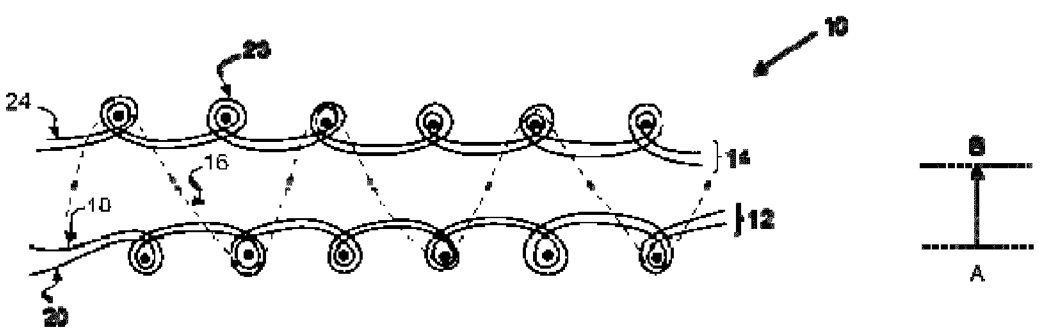
FIG. 1 illustrates a schematic representation of a double jersey plaited construction fabric as encompassed herein in accordance to an embodiment.

As seen in FIG. 1, the fabric 10 comprises a first layer 12 which is the layer next to the skin A (inner layer) and a second layer 14 which correspond to the layer of the fabric 10 facing the exterior B (outer layer) and away from the skin A. As illustrated in FIG. 1, in an embodiment, a connecting yarn 16 binds together the first fabric layer 12 and the second fabric layer 14 tightening the fabric 10 together. The moisture from a wearer's skin is pushed through the first fabric layer 12 towards the second fabric layer 14. The presence of a hydrophilic (moisture regain) gradient between the first fabric layer 12, being a semi-hydrophilic layer, and the second fabric layer 14, representing a hydrophilic layer, of the fabric 10 allows the moisture to be pushed as indicated from the direction of the arrow between region A of the skin towards exterior region B.

The first fabric layer 12 in an embodiment comprises a first yarn 18 and the second fabric layer 14 comprises a second yarn 23. In the illustrated embodiment of FIG. 1, the first fabric layer 12 further comprises a third yarn 20 knitted or woven together to form the next to skin A inner fabric layer 12, the first fabric layer 12 being a semi-hydrophilic or hydrophobic layer as mentioned. It is encompassed that the first yarn 18 and the third yarn 20 are a synthetic polymer, such as for example but not limited to, a polyester, a polypropylene, an acrylic, a polyacrylic or any combination thereof. As illustrated herein, the third yarn 20 is an elastane, resulting in a first fabric layer 12 being a composite blend of a synthetic polymer plaited with an elastane. In one embodiment, the first yarn 18 can be a composite of synthetic polymer and natural fiber such as for example, cotton, wool, silk or regenerated cellulosic fibers and can be configured as semi-hydrophilic with a first moisture regain. For example the first yarn 18 can be a blend of 70-95% synthetic polymer (e.g., polyester) and 5-30% natural fibers (e.g., cotton).

The second fabric layer 14 further comprises a fourth yarn 24 knitted or woven together to form a face (outer) fabric layer 14 facing towards outside B, the second fabric layer 14 being a hydrophilic layer. As encompassed, the second yarn 23 comprises a natural fiber, such as for example and not limited to, a cotton, silk, wool, modal, micro-modal, rayon, lyocell, viscose or a combination thereof. The second yarn 23 can alternatively be a composite blend of a modal and a cotton. Alternatively, the second yarn can also be a synthetic polymer such as for example a nylon, a polyester, a polypropylene, an acrylic, a polyacrylic or a combination thereof. The fourth yarn 24 can be a synthetic polymer, such as elastane. As a further embodiment, it is encompassed a second fabric layer 14 comprising a composite blend of a natural fiber plaited with an elastane. In one embodiment, the second yarn 23 is a composite blend of natural or regenerated cellulosic fiber and synthetic fiber such as nylon, a polyester, a polypropylene, an acrylic. One means to increase the hydrophilic nature of the second layer 14 is to increase its surface area. Accordingly, it is encompassed that the second fabric layer 14 can be pitched to increase its surface area.

Figure 6:
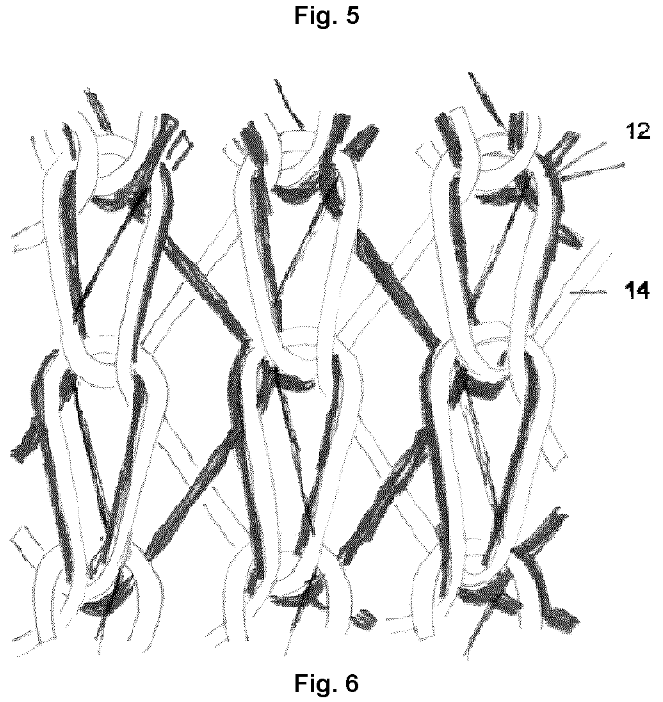
FIG. 6 illustrates a schematic representation of a plaited tricot (warp) knitted construction fabric as encompassed herein in accordance to an embodiment.

The connecting yarn 16 binding together the first fabric layer 12 and the second fabric layer 14 is at least a single strand. As encompassed herein, the connecting yarn 16 is an elastane. It is also encompassed that the connecting yarn 16 is a synthetic polymer such as for example a nylon, a polyester, a polypropylene, an acrylic, a polyacrylic or a combination thereof. Alternatively, the connecting yarn 16 as described herein can comprise preferably a natural fiber such as for example a cotton, silk, wool, modal, micro-modal, rayon, lyocell, viscose or a combination thereof. The connecting yarn is preferably a zig-zag structure (an overlap) between the first fabric layer 12 and the second fabric layer 14. It is encompassed that the zig-zag structure consist of a lapping back and forth between first and second layer fabrics in order to connect them (FIG. 6). The connecting yarn 16 can be single strand or multiple strands. Each strand of the plurality of strands of the connecting yarn 16 can have independent zig-zag (underlap and overlap) structure.

It is thus described a fabric construction comprising an hydrophilic side and a semi hydrophilic or hydrophobic side allowing maximum moisture control. The fabric describe herein has the characteristic to push the moisture by a hydrophilic gradient using semi-hydrophilic and fully-hydrophilic layers next to each other. The combination of potentially 4 different types of fibers and the semi-hydrophilic or hydrophobic and fully-hydrophilic surfaces next to each other allows for efficient moisture management and quick drying.

Figure 2:
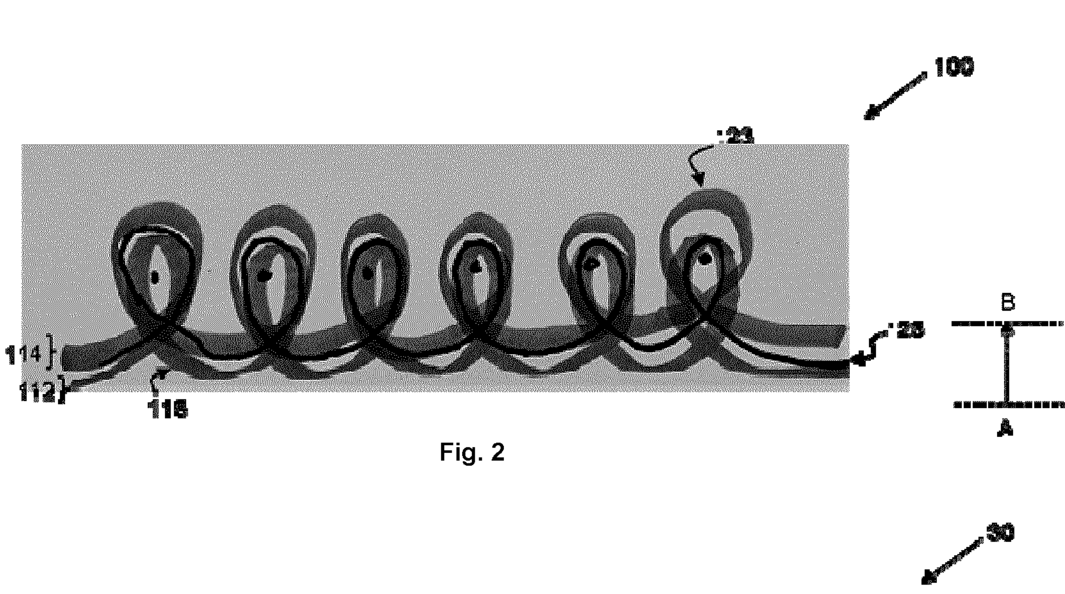
FIG. 2 illustrates a schematic representation of a single jersey plaited construction fabric in accordance to another embodiment.

As described herein, in some embodiments, the described fabric is made with a knitting construction which can be a weft knitted or wrap knitted structure. For example, the fabric can be a single jersey plaited construction (see FIG. 2) or a double jersey plaited construction for example (see FIG. 1) or Tricot warp knit plaited structure. As illustrated in FIG. 2, the fabric 100 has a single jersey plaited construction with a first layer 112 that comprises a first yarn 118 having the first moisture regain and a second layer 114 that comprises a second yarn 123 with the second moisture regain. The first moisture regain is lower than the second moisture regain providing a hydrophilic gradient between the first fabric layer 112 and the second fabric layer 114 of the fabric 100 thus pushing the moisture through the first fabric layer 112 and out through the second fabric layer 114. The fabric 100 further comprising a plaited yarn 125. The plaited yarn 125 can be elastane to increase the elasticity of the fabric 100.

In an embodiment, the moisture regain of the first fabric layer is in the range of 0.2%-6% and the moisture regain of the second fabric layer is in the range of 4%-16% and the moisture regain gradient between the two fabric layers is greater than 3%.

In an embodiment, at least one of the first, second, third or fourth yarn are fabricated using a compact spinning technique to spin the cotton/micromodal yarn for example that helps reducing pilling and better handfeel.

Figure 3:
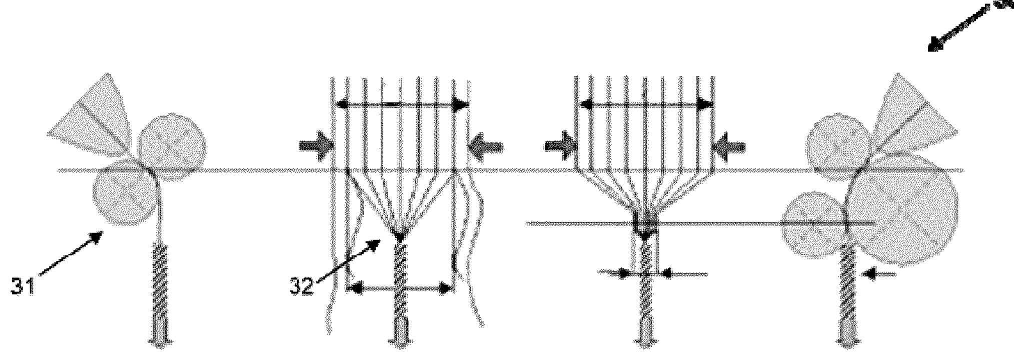
FIG. 3 illustrates a compact spinning technique used for the fabrication of the yarns as encompassed herein.

As seen in FIG. 3, in traditional spinning machines, such as ring spinner 31, the fiber stream is twisted without first being brought close together by compressing it (compacting) and the resulting yarn may pill or feel rough due to the broad twisting triangle 32 formed before the fibers are twisted. Compact spinning 30 involves narrowing and decreasing the width of the band of fibers ($b_{comp}$) so that it is much narrower than the width of the fibers band ($b_{ring}$) in the ring spinning 31 (see FIG. 3). Such compacted fibers band is then twisted into a yarn, and the x twisting triangle is eliminated. Compacting the fiber stream first causes the fiber stream in the form of the flat band of fibers to be condensed into a compact fiber stream with increased frictional contact points between the fibers. Compact spinning allows to produce compact yarns. Thus, compact spinning is a process where fiber strand drawn by drafting system is condensed before twisting it.

In some embodiment, at least one of the first, second, third or fourth yarn are fabricated using a ring spinning technique, such as Sirospun™, core spun, compact spun where one yarn can be a natural fiber and the other yarn can be a synthetic fiber. Any other spinning technique (e.g. air jet spinning, ring spinning, mule spinning) can be used without departing from the scope of the invention.

Figure 4A:
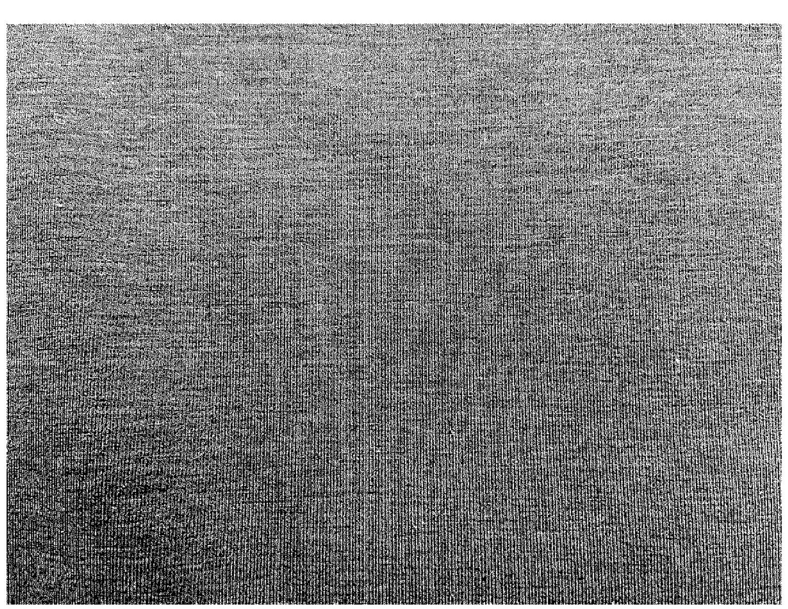
FIG. 4A illustrates the outer layer a fabric in accordance to an embodiment.
Figure 4B:
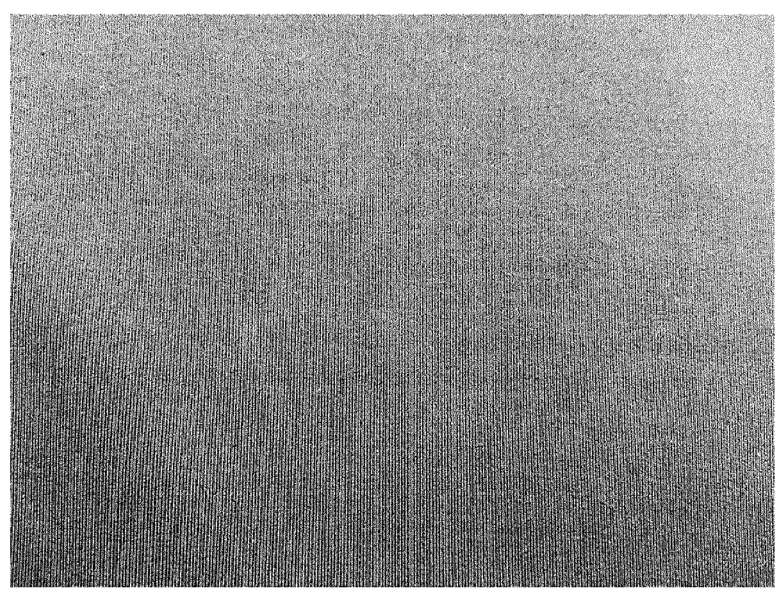
FIG. 4B illustrates the inner layer of the fabric shown in FIG. 4A in accordance to an embodiment.

FIG. 4 provides a picture of a fabric comprising 26% cotton and 26% modal forming the outer layer with higher moisture regain fibers in A), and 25% elastane and 23% nylon forming an inner layer with lower moisture regain allowing and moisture management as described herein.

Figure 5:
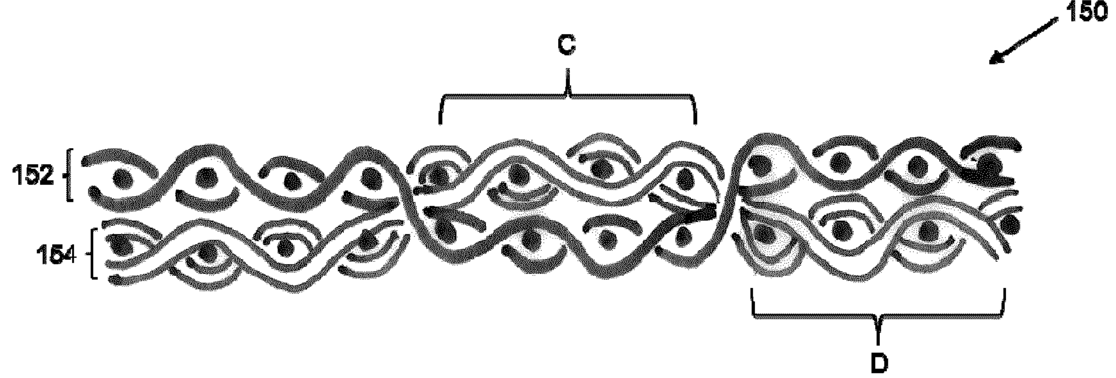
FIG. 5 illustrates a schematic representation of a double woven construction fabric as encompassed herein in accordance to an embodiment.

FIG. 5 illustrates an example of fabric construction that is double weave 150. The first 152 and the second layers 154 are woven in order to keep one fabric to one side in a way that the number of yarn cross overs is reduced. For example, in the illustrated example of fabric construction in FIG. 5, the cross over is 3 up C and 3 down D but it can be a sequence of 3 up and one down, 3 up and 2 down, or 4 up and 1 down etc.

As encompassed herein, the knitted fabric described herein with moisture management can be any type of articles of apparel including shirts, headwear, coats, jackets, pants, underwear, gloves, socks, and footwear.

While the disclosure has been described in connection with specific embodiments thereof, it will be understood that it is capable of further modifications and this application is intended to cover any variations, uses, or adaptations including such departures from the present disclosure as come within known or customary practice within the art and as may be applied to the essential features hereinbefore set forth, and as follows in the scope of the appended claims.

What is claimed is:

1. A fabric with moisture management function comprising:

a first fabric layer comprising a first yarn forming the first fabric layer, the first fabric layer being semi-hydrophilic with a first moisture regain in a range of 0.2%-6%; and a second fabric layer comprising a second yarn forming the second fabric layer, the second fabric layer being hydrophilic with a second moisture regain in a range of 4%-16%, wherein the first moisture regain is lower than the second moisture regain and a difference between the second moisture regain and the first moisture regain is greater than 3% so as to act to pull moisture through the first fabric layer and push it out through the second fabric layer.

2. The fabric of claim 1, wherein the fabric is a weft or warp knitted fabric or a woven fabric.

3. The fabric of claim 1, wherein a maximum difference between the second moisture regain and the first moisture regain is 15%.

4. The fabric of claim 1, wherein at least one of the first yarn and the second yarn is a synthetic polymer yarn.

5. The fabric of claim 1, wherein the first yarn comprises fibers selected from a group of a nylon, a polyester, a polypropylene, an acrylic, cotton, wool, silk, regenerated cellulosic fibers or any blend or combination thereof.

6. The fabric of claim 1, wherein the first fabric layer further comprises a third yarn joined together with the first yarn and the second fabric layer further comprises a fourth yarn joined together with the second yarn.

7. The fabric of claim 6, wherein the third yarn is an elastane yarn.

8. The fabric of claim 6, wherein the first fabric layer comprises a synthetic polymer yarn plaited with an elastane yarn.

9. The fabric of claim 1, wherein the second yarn comprises a natural fiber, a regenerated cellulosic fiber or a blend of natural or regenerated cellulosic fibers with synthetic fibers.

10. The fabric of claim 9, wherein the synthetic fibers comprise nylon fibers, polyester fibers, polypropylene fibers, acrylic fibers, or a combination thereof.

11. The fabric of claim 9, wherein the second yarn comprises fibers selected from the group consisting of a cotton, silk, wool, modal, micro-modal, rayon, lyocell, viscose, cupro, artificial silk, nylon, a polyester, a polypropylene, an acrylic and any combination thereof.

12. The fabric of claim 6, wherein the fourth yarn is a synthetic polymer yarn.

13. The fabric of claim 12, wherein the fourth yarn is an elastane yarn.

14. The fabric of claim 6, wherein the second fabric layer comprises a natural fiber yarn plaited with an elastane yarn or comprises a yarn including a blend of natural fibers and synthetic fibers.

15. The fabric of claim 14, wherein the synthetic fibers comprise nylon fibers, polyester fibers, polypropylene fibers, acrylic fibers, or a combination thereof.

16. The fabric of claim 1, wherein the second yarn is a synthetic polymer yarn.

17. The fabric of claim 16, wherein the second yarn comprises fibers selected from a group consisting of a nylon, a polyester, a polypropylene, an acrylic, a blend with cotton, silk, wool, modal, micro-modal, rayon, lyocell, viscose, cupro, and artificial silk, and a combination thereof.

18. The fabric of claim 1, wherein the second fabric layer is pitched to increase its surface area.

19. A fabric with moisture management function comprising:

a first fabric layer comprising a first yarn forming the first fabric layer, the first fabric layer being semi-hydrophilic with a first moisture regain in a range of 0.2%-6%; and a second fabric layer comprising a second yarn forming the second fabric layer, the second fabric layer being hydrophilic with a second moisture regain in a range of 4%-16%, wherein the first moisture regain is lower than the second moisture regain and a difference between the second moisture regain and the first moisture regain is greater than 3% so as to act to pull moisture through the first fabric layer and push it out through the second fabric layer, wherein the fabric is knitted and further comprises a connecting yarn binding together the first fabric layer and the second fabric layer.

20. The fabric of claim 19, wherein the connecting yarn is at least a single strand yarn.

21. The fabric of claim 19, wherein the connecting yarn is a synthetic polymer yarn.

22. The fabric of claim 19, wherein the connecting yarn is an elastane yarn.

23. The fabric of claim 19, wherein the connecting yarn is a natural fiber yarn.

24. The fabric of claim 19, wherein the connecting yarn forms a zig-zag structure connecting the first fabric layer and the second fabric layer.

25. The fabric of claim 1, wherein the fabric is knitted from a single jersey plaited construction, a double jersey plaited construction, a tricot knit construction, or a warp knit construction.

26. The fabric of claim 6, wherein at least one of the first yarn, the second yarn, the third yarn and the fourth yarn is a compact-spun yarn.

27. The fabric of claim 1, wherein the weaves of first fabric layer and the second fabric layer include a number of yarn cross overs.

28. The fabric of claim 27, wherein the number of yarn cross overs include 3 up and 3 down, 3 up and one down, 3 up and 2 down, or 4 up and 1 down.

29. An article of apparel comprising a fabric with moisture management function, the fabric comprising:

a first fabric layer comprising a first yarn forming the first fabric layer, the first fabric layer being semi-hydrophilic with a first moisture regain in a range of 0.2%-6%; and a second fabric layer comprising a second yarn forming the second fabric layer, the second fabric layer being hydrophilic with a second moisture regain in a range of 4%-16%, wherein the first moisture regain is lower than the second moisture regain and a difference between the second moisture regain and the first moisture regain is greater than 3% so as to act to pull moisture through the first fabric layer and push it out through the second fabric layer.

* * * * *